United States Patent [19]

Lankin et al.

[11] Patent Number: 5,331,258
[45] Date of Patent: Jul. 19, 1994

[54] SYNCHRONOUS-RECTIFICATION TYPE CONTROL FOR DIRECT CURRENT MOTORS AND METHOD OF MAKING

[75] Inventors: Robert Lankin; Andrew E. Lankin, both of Ontario; Richard J. Hellinga, Kitchener, all of Canada

[73] Assignee: Solaria Research Enterprises, Ltd., Canada

[21] Appl. No.: 859,226

[22] Filed: Mar. 30, 1992

[51] Int. Cl.$^5$ .................................................. H02P 5/00
[52] U.S. Cl. ................................... 318/139; 388/827; 388/829; 388/907.5
[58] Field of Search .............................. 388/825–826, 388/827, 828–841, 905, 907, 917–918, 926, 907.5; 318/139, 280–281, 254, 439, 138

[56] References Cited

U.S. PATENT DOCUMENTS

| | | | |
|---|---|---|---|
| 3,845,368 | 10/1974 | Elco ..................................... | 318/139 |
| 4,012,680 | 3/1977 | Dickerson et al. ............. | 318/493 X |
| 4,247,807 | 1/1981 | Wilson ............................ | 318/493 X |
| 4,386,299 | 5/1983 | Pham ................................. | 318/261 |
| 4,523,134 | 6/1985 | Kinoshita et al. ............... | 318/599 X |
| 4,626,750 | 12/1986 | Post ....................................... | 318/139 |
| 4,649,326 | 3/1987 | Mansmann et al. ................. | 318/293 |
| 4,730,151 | 3/1988 | Florey et al. ......................... | 318/139 |
| 4,763,049 | 10/1988 | Magee ................................... | 318/254 |
| 4,851,743 | 7/1989 | Schmerda et al. ...................... | 388/84 |
| 4,991,676 | 2/1991 | Monishita ............................ | 388/831 |
| 5,029,229 | 7/1991 | Nelson ................................. | 388/811 |
| 5,039,924 | 8/1991 | Avitan ................................. | 318/139 |
| 5,107,387 | 4/1992 | Orton ................................. | 318/139 X |
| 5,162,710 | 11/1992 | Reinhart et al. ..................... | 318/254 |
| 5,179,621 | 1/1993 | Nelson ................................. | 318/811 |

FOREIGN PATENT DOCUMENTS 91302203.4 11/1991 European Pat. Off. .

OTHER PUBLICATIONS

Article entitled "Microprocessor-Based High-Efficiency Drive of a DC Motor," IEEE Transactions on Industrial Electronics, vol. IE-34, No. 4, Nov. 1987, pp. 433–440.

Primary Examiner—William M. Shoop, Jr.
Assistant Examiner—David Martin
Attorney, Agent, or Firm—Varnum, Riddering, Riddering, Schmidt & Howlett

[57] ABSTRACT

A MOSFET control topology and a physical structure for a motor control which provide a more efficient and economic DC motor control are disclosed. The control topology introduces a synchronous-rectification technique wherein free-wheel diodes are replaced with MOSFET devices that are switched on and off by a logic circuit so that they are conductive for commuting motor current during periods that the motor current supply is switched off. The physical structure and method of assembling a DC motor control eliminate time consuming assembly techniques while ensuring effective waste heat exchange between electronic components and a heat sink of the control by providing quick-install spring retainers for urging the components into heat sink conducting contact with the heat sink. The physical structure also provides for high density packing of electronic components in a controller.

12 Claims, 5 Drawing Sheets

SYNCHRONOUS-RECTIFICATION TYPE CONTROL FOR DIRECT CURRENT MOTORS AND METHOD OF MAKING

The present invention relates to direct current motor control systems used in controlling the rotational speed of traction motors for battery-powered vehicles and, in particular, to a novel DC motor control topology and structure.

RELATED APPLICATION

The present application is related to U.S. patent application Ser. No. 07/859,590, filed concurrently herewith for "An Optimal DC Motor/Controller Configuration".

BACKGROUND OF THE INVENTION

The control systems which currently dominate the battery-powered direct current motor market fall into two principal categories, control systems which use silicon controlled rectifiers and those which use metal-oxide-semiconductor field effect translators for switching DC current to control motor speed.

Silicon controlled rectifiers (SCRo) are commonly employed in heavy equipment control devices for providing a variable mark-space ratio power regulator responsive to a motor current command signal. SCR controllers have been widely accepted and are proven to be reliable in most operating conditions. SCR controllers do have disadvantages, however. SGR controllers are physically bulky and massive. They are also known to dissipate substantial amounts of energy and they are not well suited for automated assembly techniques. In addition, although SCR devices are readily switched on extra commutation circuitry is required to switch them off. A further problem with SCR controllers is that the commutation frequency of those controllers is in the audible range, commonly at 2000 Hz or less. During operation, SGR controllers therefore tend to emit an audible hum and a poorly designed SCR controller can emit noise which humans find irritating and fatiguing.

More recently, metal-oxide-semiconductor field effect transistor (MOSFET) controllers have been invented. Such controllers are disclosed in U.S. Pat. No. 4,626,750 which issued Dec. 2, 1986 to Curtis Instruments.

In these controllers silicon controlled rectifiers are replaced with MOSFETS for switching battery current in an on-off pulse to vary the current to the drive motor, thereby varying the motor torque and consequently the motor's rotational speed. MOSFETs are advantageous because they have a high input impedance, low energy dissipation and are readily switched from a conductive to a nonconductive state without additional circuitry. MOSFETs are also advantageous because they are small devices that are well suited for use with automated assembly techniques. They are further advantageous because the per unit cost of the device is rapidly decreasing as a result of utilization in a wide range of consumer, industrial and automotive applications. MOSFETs are also switchable at frequencies which are at the limit of, or beyond the audible range for humans so that MOSFET controllers reduce or eliminate controller-generated audible noise.

These two types of DC motor controllers, collectively known as pulse-width modulated (PWM) motor controllers, include free-wheeling diodes for commutating armature current generated by a motor during periods of operation when the battery current is switched off. Without free-wheeling diodes, the voltage transient generated by the armature when the switching device opens would destroy the control. Although free-wheeling diodes are effective for communicating those currents, they have the disadvantage of contributing to significant power losses through waste heat generation. For example, a forklift accelerating up a grade may require 500 A to the motor armature at a 20 percent PWM duty cycle. Under such conditions, free wheeling diodes generate some 480 Watts, assuming a forward voltage drop of 1.2 V at 500 A which is typical of free-wheeling diodes. Prior art MOSFET controls go into "thermal cutback" under heavy lugging and prolonged acceleration as a result of this heat generation by the free-wheeling diodes. Consequently, MOSFET controllers have not been used extensively in the Class 1 and Class 2 truck markets. MOSFET controllers have only seen reasonable acceptance in the smaller Class 3 Walk behind truck market and small electric vehicle markets, such as electric golf carts and light baggage carriers.

SUMMARY OF THE INVENTION

It is an object of the invention to provide an electronic controller for a direct current traction motor which permits sustained creeping and lugging of a vehicle driven by the motor without entering a condition of thermal cutback due to heat build-up in the physical structure of the controller.

It is a further object of the invention to provide an electronic controller for direct current traction motors which reduces energy consumption, especially during vehicle lugging and creeping conditions.

It is yet a further object of the invention to provide an electronic controller for direct current traction motors which is more economic to construct than prior art controllers.

It is another object of the invention to provide an electronic controller which operates at a commutation frequency that is above the upper frequency threshold of hearing for human beings.

It is yet a further object of the invention to provide a MOSFET switched DC motor controller which is suitable for use in Class 1 and Class 2 electrically powered trucks.

A DC motor control in accordance with the invention introduce a technique hereinafter referred to as "synchronous-rectification" in which the free-wheeling diodes in prior art controllers are replaced with MOSFET devices. The synchronous rectification MOSFETs, hereinafter referred to as "SR FETs" are switched on during intervals that free-wheeling diodes would be conducting. Since MOSFETs have a much lower forward voltage drop than free-wheeling diodes, the resulting control is significantly more efficient. In the example described above, free-wheeling diodes generate some 400 Watts while SR FETs under equivalent conditions generate only about 120 Watts. Consequently, synchronous-rectification significantly reduces controller heating during heavy lugging and prolonged acceleration. Synchronous-rectification controls are therefore capable of sustained high amperage throughputs and are suitable for use in Class 1 and 2 trucks as well as Class 3 trucks.

The invention thus provides an electronic control for direct current traction motors comprising a first plurality of parallel-connected power field effect transistors arranged for connection in series with the motor, a field gate electrode of each first field effect transistor being connected to a common control line for controlling an on-off cycle of conduction through the first field effect transistors to provide drive current to the motor from a direct current source; and a second plurality or parallel connected power field effect transistors arranged for connection in parallel with the motor, a field gate electrode of each second field effect transistor being connected to a common control line for controlling a synchronous-rectification on-off cycle of conduction through the second field effect transistors for commuting the motor current when the first parallel connected field effect transistors are switched off.

In accordance with a further aspect of the invention there is provided a physical structure for a direct current traction motor controller which includes a heat sink structure having a top surface; the top surface of the heat sink structure including at least two spaced-apart channels for receiving a first and second plurality of electronic components affixed to a circuit board positioned on the top surface; and, at least two elongated retainers respectively insertable in the channels while the electronic components are received therein, the retainers being movable after insertion in the channels to a disposition wherein they urge the respective first and second plurality of electronic components to a heat exchanging contact with a sidewall of the respective channels. This physical structure permits a high density packing of electronic components.

The invention thus provides a novel energy-conserving control topology, and a novel physical structure for a DC motor controller which is more economically assembled and permits a higher packing density of components than prior art controls for motors of the same type.

Synchronous-rectification type controls are suitable for use with series wound motors as well as separately excited motors. Although the description of the preferred embodiments which follows relates to series wound motors, the invention is in no way limited to series wound motors in its utility.

BRIEF DESCRIPTION OF THE DRAWINGS

The invention will now be described by way of example only and with reference to the following drawings, wherein.

DESCRIPTION OF THE PREFERRED EMBODIMENTS

Figure 1:
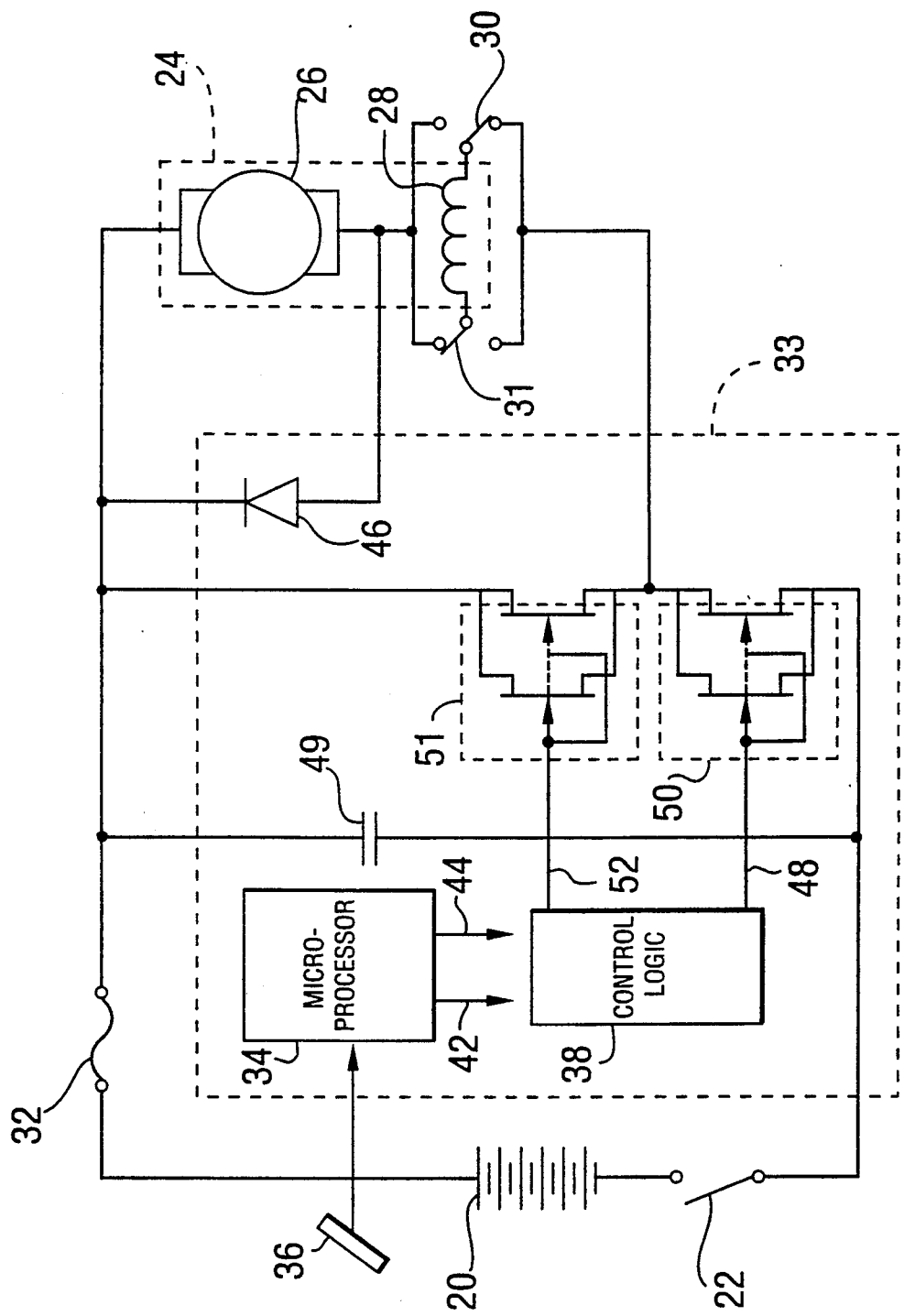
FIG. 1 is a schematic diagram of the topology of an electronic control for a direct current traction motor in accordance with the invention.

FIG. 1 shows a schematic diagram of a direct current motor system which includes an electronic control topology in accordance with the invention. The system includes a battery 20 and a series wound DC traction motor, generally referred to by reference 24 which includes an armature 26 and a field winding 28 having associated motor direction contactors 30, 31 for reversing a direction of a torque of the motor 24.

The circuit is provided with a disconnect 22 used for disconnecting the battery from the motor. A fuse 32 protects the circuit from extreme current conditions which can arise, for instance, if short circuit condition develops in the system. Other details of the circuit are constructed in accordance with well-known electrical principles which are familiar to those skilled in the art.

The electronic control in accordance with the invention, generally referred to by reference 33, includes that portion of the diagram in FIG. 1 surrounded by a dotted line. The control includes a microprocessor 34 which receives an input signal from an accelerator potentiometer 36. The microprocessor 34 processes the accelerator input and output signals to a control logic 38. Those signals include an enable signal 42 and a pulse-width modulated motor current command (PWM) signal 44. As will be understood by those skilled in the art, the signals that the microprocessor 34 outputs on enable line 42 and PWM line 44 are dependent on a number of variables in addition to the input signal from the accelerator potentiometer 36. Other variables which affect the microprocessor output on the enable line 42 and the PWM line 44 may include battery current, motor current, motor direction, battery voltage, control heat sink temperature, hydraulic pump status, and seat switch status if the control 33 is installed in a vehicle having an operator's seat. There is also a "plug braking" sensing circuit which monitors the direction of flow of current through a plug brake diode 46 that is connected in parallel with the armature of motor 24. The plug-braking diode commutes armature current when the motor field is reversed for an operation known as "plug braking", commonly used to slow down an electric vehicle by reversing the polarity of the motor. It is hereinafter assumed that those skilled in the art of electronic controls are familiar with the algorithms used to generate a PWM signal for controlling the current to a DC motor.

A control logic circuit 38 drives the gate electrode of a plurality of motor MOSFETs 50, herein after referred to as "Motor FETs", and the gate electrodes of a plurality of synchronous-rectification MOSFETs 51, referred to as "SR FETs", as noted above.

The function of Motor FETs 50 is well understood in the art. Motor FETs 50 are switched on and off by the common control line 48 in an on-off cycle of conduction to provide drive current to the motor 24 from the battery 20. When Motor FETs 50 are switched off, the motor 24 resists the decay of current on commutation of the supply current by the Motor FETs 50. In prior art controllers, reverse connected "free-wheeling" diodes have been parallel connected with the motor to commute the inductive load when the Motor FETs 50 are switched off. In accordance with the invention, those free-wheeling diodes are replaced by SR FETs 51 which are switched on when Motor FETs 50 are switched off thus providing a path of conduction for the armature current of motor 24 as the current path through Motor FETs 50 is closed. The timing of the on-off cycle of Motor FETs 50 and SR FETs 51 is critical and shall be explained in more detail below in relation to FIGS. 3 and 4.

The control in accordance with the invention also includes a plurality of capacitors 49, as is common in MOSFET controllers. The capacitors are preferably low equivalent-series-resistance, low inductance and high capacitance components which isolate the battery from the ripple current created by the switching cycle of the MOSFETs.

Figure 2:
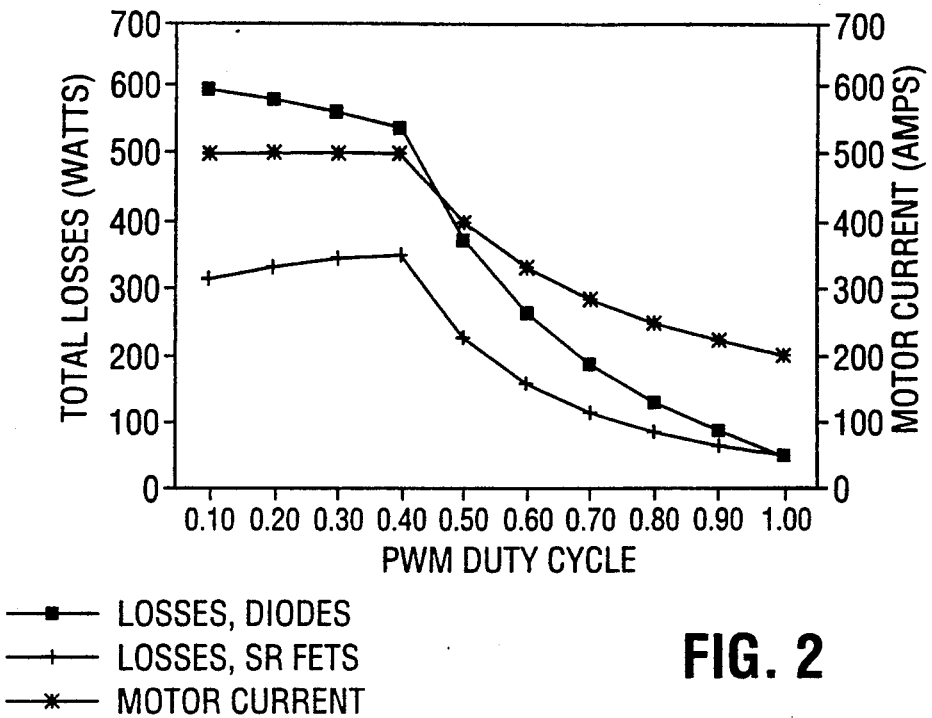
FIG. 2 is a graph of the theoretical loss comparisons of a prior art MOSFET control which uses free-wheel diodes to commute motor current compared to a synchronous-rectification type control in accordance with the invention.

FIG. 2 shows a graph of the theoretical loss comparisons for controllers based on a free-wheel diode control system as compared with a synchronous-rectification control system in accordance with the invention.

The horizontal axis of the graph represents the percent duty cycle of the motor current drive signal. Duty cycle is a measure of the pulse width of the motor current drive signal. At a 100% duty cycle, the motor is connected to the battery via the Motor FETs 50 100% of the time, while at a 20% duty cycle the motor is connected to the battery 20% of the time. The vertical axis of the graph represents both the motor current in Ampe and the controller energy losses in Watts.

As is apparent from the graph, theoretical losses in free-wheel diode control systems are dramatically greater than theoretical losses in synchronous-rectification control systems. This is especially true when duty cycles are below 50 percent and motor currents are 400 A or more. These conditions of motor operation are commonly referred to as "lugging" conditions. It is well-known that during lugging of DC motors, free-wheel diode type control systems tend to enter thermal cutback wherein the duty cycle is reduced in order to permit waste heat built up in the control heat sink to dissipate. As is apparent from the graph, cutback of the duty cycle can cause more rapid heating, further exacerbating the problem. The theoretical losses in waste heat energy are cut by almost 50% at a 10% duty cycle, and more than 30% at a 50% duty cycle. Synchronous-rectification type controls therefore significantly reduce heating in the physical structure of a controller during heavy lugging and prolonged acceleration by improving the energy efficiency of the control system.

Figure 3:
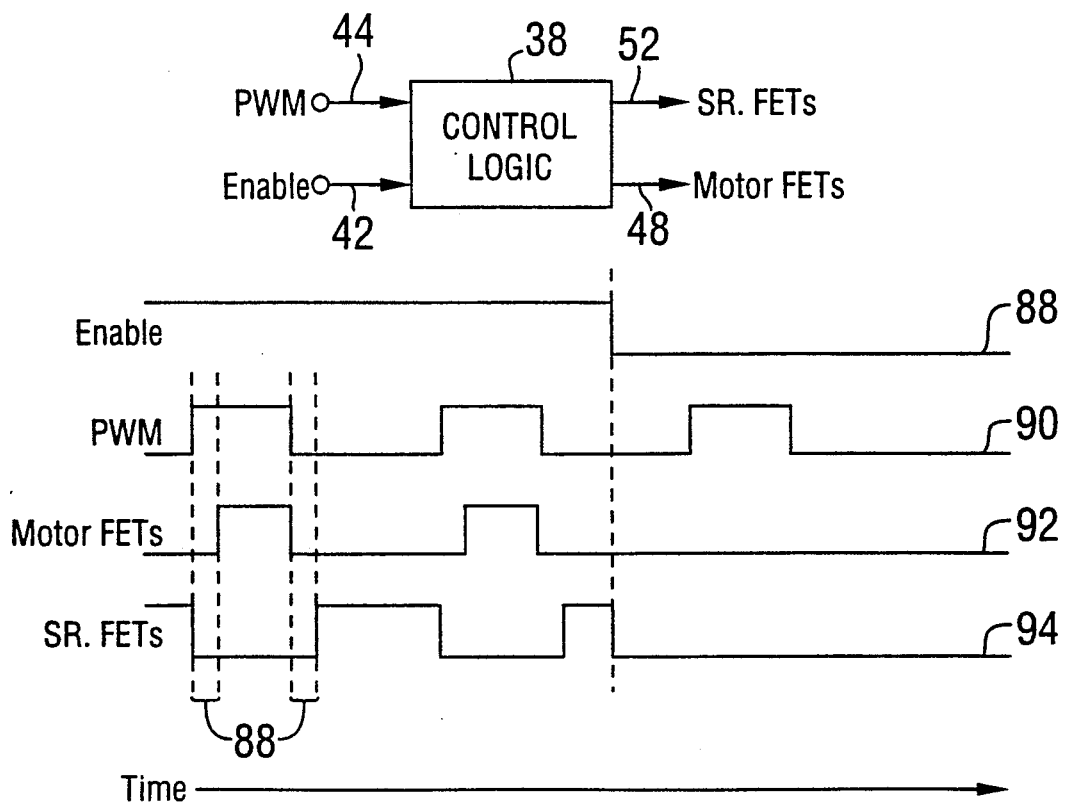
FIG. 3 is a schematic diagram of the control logic circuit illustrating the relationship between the enable and pulse-width modulated signals input to the control logic circuit and the motor FET and SR FET output signals generated by the control logic circuit.

FIG. 3 is a timing diagram illustrating the inputs and outputs of control logic circuit 38. The purpose of the control logic circuit 38 is to generate gate signals which turn the Motor FETs 50 on when the PWM is driven high and to turn the SR FETs 51 on when the Motor FETS 50 are off, thus preventing the Motor FETs 50 and SR FETS 51 from being simultaneously conductive. The control logic also receives an enable signal which permits microprocessor 34 (see FIG. 1) to turn off both the Motor FETs and the SR FETs if a fault condition is detected. As seen at the top of FIG. 3, microprocessor 34 outputs a PWM motor current command signal on PWM line 44 and an enable signal on enable line 42 to control logic circuit 38. The control logic circuit 38 outputs a Motor FET gate control signal on line 48 and a SR FET gate control signal on line 52. In order to provide an electronic DC motor control which does not emit noise in the range audible to humans, the microprocessor 34 preferably outputs the PWM pulse at 20,000 Hz, which is well within the operating limits of the Motor FETs 50 and the SR FETs 51.

At the bottom of FIG. 3 are shown the input and output signals of control logic 38 in relation to a timeline. As explained above, microprocessor 34 generates an enable signal and a PWM signal on lines 42 and 44 respectively. The enable signal is driven high at all times factors monitored by the microprocessor 34 indicate that the system is in a safe operating condition. The enable signal 88 is driven low to ensure that both Motor FETs and SR FETs are switched off whenever a parameter monitored by the microprocessor 34 indicates a system or operator malfunction. For instance, if a vehicle is equipped with a seat switch and the operator leaves the seat of the vehicle for a predetermined length of time, the enable signal is driven low and the control logic cuts power to the drive motor 24 (see FIG. 1) by switching off both the Motor FETs 50 and the SR FETs 51. A PWM signal 90 is generated by the microprocessor 34 in response to an output of an accelerator potentiometer 36, as well as other variables monitored by the microprocessor and described above. As is apparent from FIG. 3, a time delay 86 separates the periods when the Motor FETs 50 are switched on and the periods when the SR FETs 51 are switched on. The time delay 86 is necessary to accommodate the switching response time of the FET devices. Power FETs may take as long as 700 ns to switch fully off in response to a gate signal. Without time delay 86, a brief period would exist when the motor FETs 50 and SR FETs 51 were both conductive, resulting in large current surges. This delay is preferably a few tens of nanoseconds longer than the device switch response time of the respective FETs.

As will be apparent to those skilled in the art, many techniques exist for generating the signals illustrated in FIG. 3.

Figure 4:
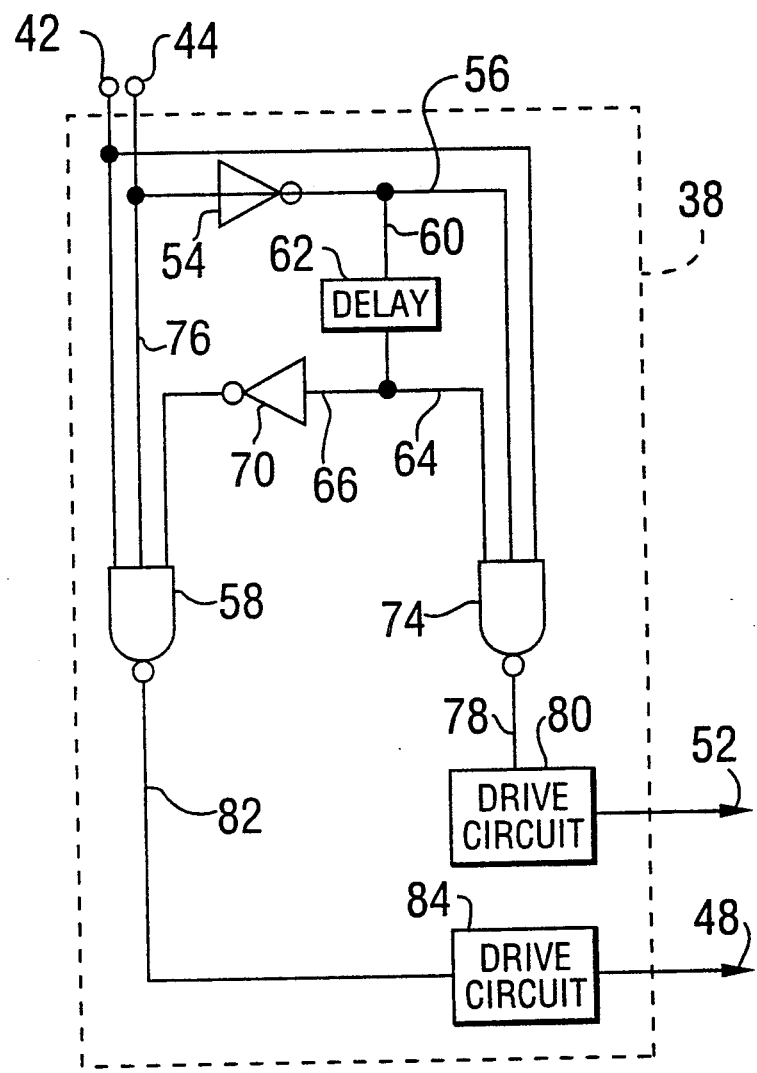
FIG. 4 is a simplified schematic circuit diagram of a preferred embodiment of the control logic circuit in accordance with the invention.

FIG. 4 shows a schematic diagram of a preferred embodiment of the control logic circuit 38. The PWM line 44 and the enable line 42 transmit signals from the microprocessor 34 (see FIG. 1) to the control logic circuit 38. The PWM line 44 is connected to a first phase inverter 54 whose output is connected to an AND gate 74 by connection 56 and to a delay circuit 62 by connection 60. The delay circuit 62 may constitute any number of circuits that are capable of delaying an electrical pulse without undue distortion. Without the delay circuit 62, the drive circuits 80 and 84 for each of the Motor FETs and the SR FETs would be switched on almost simultaneously and would be mutually conductive for a brief period of time that would be adequate to short circuit the control system and cause damage to the electronic components of the controller. Delay circuit 62 must therefore delay a pulse by at least the device switch time of the FETs used in the control. Typically, a delay of about 750 nanoseconds is appropriate. The output of delay circuit 62 is connected by connection 64 to AND gate 74 and by connection 66 to a second phase inverter 70 which inverts the phase of an electrical pulse to its original condition. The output of phase inverter 70 is connected to a second AND gate 58 which also receives pulsed signals directly from PWM line 44 via connection 76. The output of AND gate 58 is directed to a drive circuit 84 for the Motor FETs 50 by a connection 48. The output of AND gate 74 is connected by a connection 78 to a drive circuit 80 for the SR FETs 51.

Figure 5:
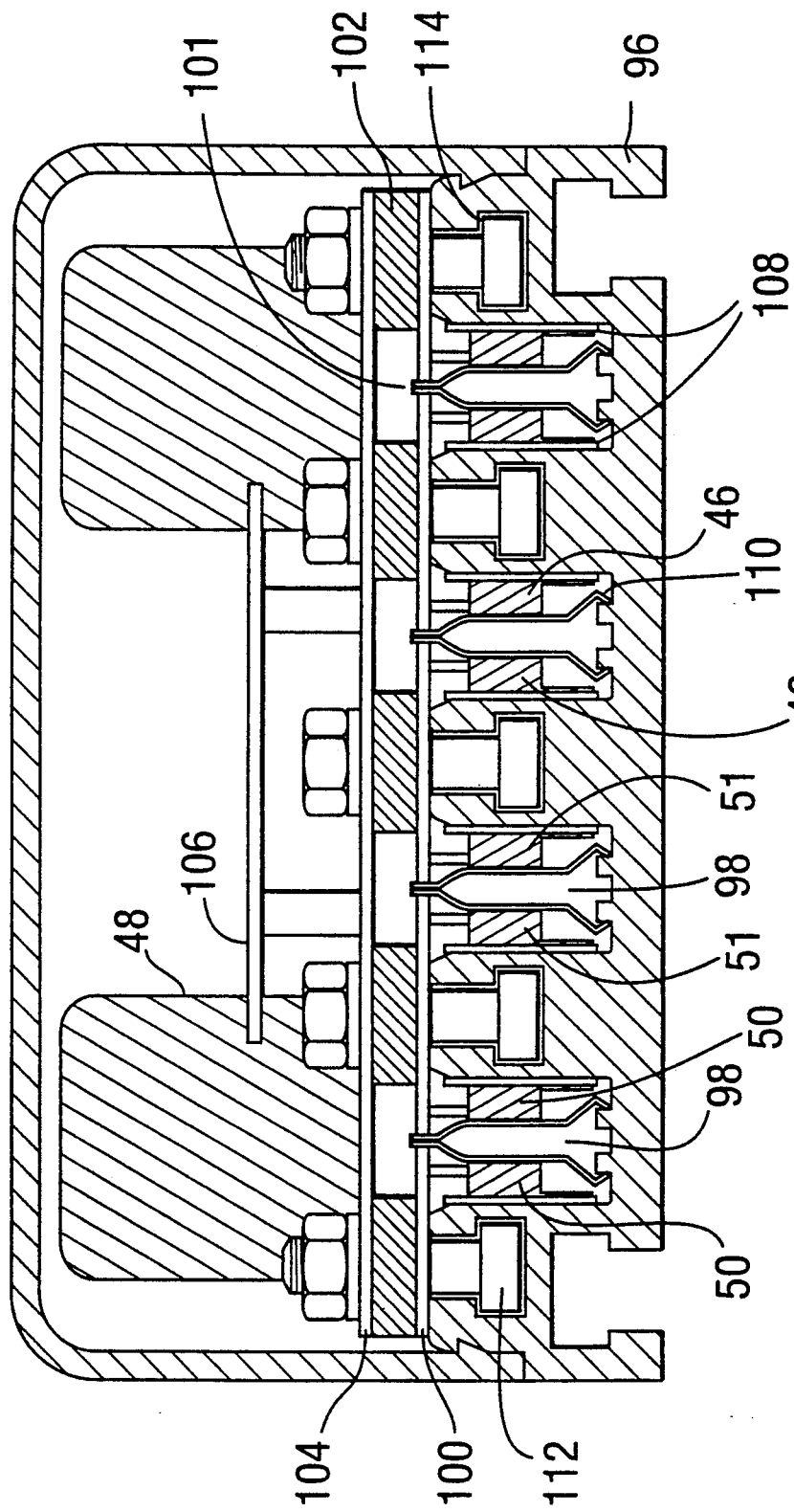
FIG. 5 is a cross-sectional view of a preferred physical structure for a controller in accordance with the invention.

FIG. 5 shows a cross-sectional view of a preferred embodiment of a novel physical structure for a motor control in accordance with the invention. Because DC motor controls switch large amounts of current, a path for waste heat dissipation from electronic switching components such as MOSFETS and diodes must be provided. Although the synchronous-rectification system in accordance with the invention generates less heat than prior art DC motor control systems, a physical structure for a controller which accommodates and facilitates the ready dissipation of waste heat is essential for efficient controller operation and extended service life. In order to ensure efficient heat dissipation, the heat generating electronic components must be maintained in close physical contact with an efficient heat sink structure. Such contact has been assured in prior art controls by the use of screw fasteners or the like. Although screw fasteners are reliable and effective, they are labour-intensive to install and therefore contribute to the cost of manufacturing a control. The physical structure for a motor controller in accordance with the invention provides an alternate method of ensuring heat conducting contact between the electronic switching components and the heat sink structure of a controller.

As shown in FIG. 5, the physical structure of a preferred embodiment of a motor controller includes a heat sink base 96. The base 96 has a top surface which includes a plurality of spaced apart channels 98 for receiving electronic switching components such as Motor FETs 50, SR FETs 51, plug brake diodes 46, and ancillary circuits. These electronic components are attached by their respective legs to a current control board 100 that is supported on the top surface of the heat sink base 96. A plurality of power bar conductors 102 rest atop current control board 100. There are preferably five power bars 102 provided. Two power bars are connected to the opposite poles of the battery 20 (see FIG. 1). One power bar 102 is connected to the motor field 28, one power bar 102 is connected to motor field/armature conjunction and one power bar 102 is connected to the motor armature 26. A capacitor board 104 rests atop the power bars 102 and supports capacitors 48. Preferably, low equivalent-series-resistance, low inductance high capacitance capacitors are connected in two rows of four capacitors each along opposite edges of the capacitor board 104. A microprocessor board 106 is supported on a top surface of capacitor board 104 between the opposite rows of capacitors 48. Microprocessor board 106 supports the microprocessor 34 and related circuitry.

In order to assemble a DG motor controller efficiently, a quick and simple method of ensuring a heat conductive contact between the electronic components of the controller and the controller heat sink is required. Electronic components such as FETs and diodes are commonly available in a component package which meets JEDEC (Joint Electron Device Engineering Council) standards. Commonly available packages are the TO220 package and the TO247 package. Either of these component packages is suitable for use in a physical structure for a controller in accordance with the invention.

In assembling a physical structure of a controller in accordance with the invention, the electronic switching components are first connected to the circuit control board 100 by inserting their respective legs into preformed holes in the circuit board 100 but the legs are not soldered to the printed circuit at this stage of the process. Electronic components of the controller are electrically insulated from the heat sink base 96. It is therefore necessary to position electrically insulating/heat conducting sheets 108 between the components and the heat sink base 96. The insulating sheets 108 are generally made of a specifically formulated plastic polymer which readily conducts heat but not electricity. The insulating sheets 108 are well-known in the art and widely available. Because insulating sheet 108 is pliable, the electronic components must be inserted into channels 98 without making intimate contact with the sheets 108. This is the principal reason for not soldering the legs of the components to the current control board 100 as it permits the components to be tilted together for insertion into respective channels 98. After the components are inserted in the channels, a pair of retainer members 110 are slid between the components. Each retainer member is preferably a structure with a dogleg-shaped cross-section made of a spring steel, or the like, each retainer member 110 is provided with registration tabs 101 which mates with alignment holes in the current control board 100. The insertion and positioning of retainer members 110 will be explained in more detail below in relation to FIG. 6. As is apparent, retainer members 110 exert a constant pressure to urge electrical components into contact with insulating sheets 108 for a direct heat conduction to the heat sink 96. Thus, an efficient transfer of waste heat is accommodated without the use of screw fasteners or other time consuming fastening techniques. In practice, it is important that motor FETs 50 and SE FETs 51 be installed in adjacent channels 98. The juxtaposition of the FETs is necessary to reduce stray inductance which could generate voltage that might destroy the FETs.

The various components of the controller are locked in an assembled condition by screw fasteners or the like which pass through preformed holes in the circuit boards and engage appropriately positioned nuts 112 that slide in inverted T-shaped slots 114 which are machined between the channels 98 in the top surface of the heat sink base 96.

Figure 6:
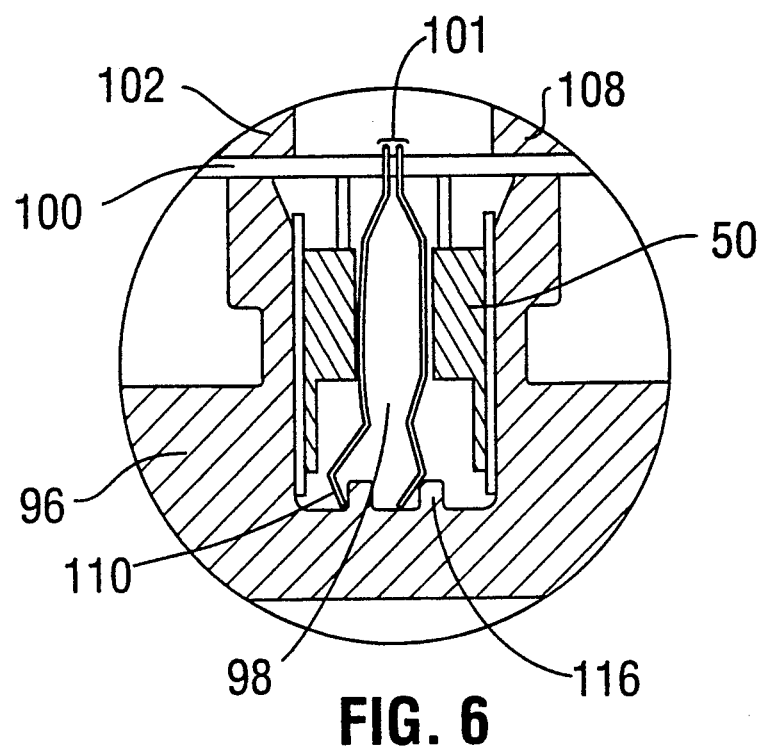
FIG. 6, which is on sheet two of the drawings, is a detailed view of a locking system for securing circuit components to sidewalls of the channels in a heat sink of the structure shown in FIG. 5.

FIG. 6 shows a detailed cross-sectional view of the electrical component fastening system in accordance with the invention. The channels 98 for receiving electrical components attached to the current control board 100 are preferably machined with two spaced apart parallel ridges 116 on a bottom surface of the channel. The retainer members 110 are slid into the channel with their bottom ends between the ridges 116. After retainer members 110 are inserted in channel 98 an elongated key having a triangular cross-section and a tapered front end (not illustrated) is inserted between the retainer members and guided by the channel formed by the ridges 116 to force the bottom edges of each retainer member over a corresponding ridge 116. The retainer member 110 shown on the left of FIG. 6 has been forced over ridge 116 using the key 118. The opposite retainer member 110 on the right is shown in a relaxed condition. Using this method, electrical components are quickly and easily locked in a heat exchanging relationship with the sides of channels 98 and the time consuming steps of drilling and tapping holes to receive screw fasteners for securing the components to the heat sink base 96 are completely eliminated. This technique also permits significantly higher component packing density because space for accommodating drilling, tapping and/or screw fastener driving equipment need not be provided. After the electronic components are locked in place against the sides of the channels 98, the legs of each component are soldered to the printed circuit and the remainder of the controller is assembled. This method permits the assembly of a DC motor controller in less time and at less expense than prior art methods.

The specific embodiments hereinbefore described are intended to be exemplary only, the scope of the invention being limited solely by the scope of the appended claims.

We claim:

1. An electronic control for a direct current traction motor, comprising:
   a first plurality of parallel-connected power field effect transistors arranged for connection in series with the motor, a field gate electrode of each first field effect transistor being connected to a first common control line for controlling an on-off cycle of conduction through the first field effect transistors to provide drive current to the motor from a direct current source; and
   a second plurality of parallel-connected power field effect transistors arranged for connection in parallel with the motor, a field gate electrode of each second field effect transistor being connected to a second common control line for controlling a synchronous-rectification on-off cycle of conduction through the second field effect transistors in synchronism with the on-off cycle of conduction of the first field effect transistors for commuting a motor current when the first parallel-connected field effect transistors are switched off.

2. The electronic control as claimed in claim 1, further including a microprocessor and a control logic circuit driven by the microprocessor, the control logic circuit having first and second discrete output lines which are in respective electrical connection with the first and second common control lines.

3. The electronic control as claimed in claim 2, wherein the microprocessor outputs two separate signals to the control logic circuit, a pulse width modulated on/off motor current regulation command signal and an enable signal to ensure that both the first and second plurality of power field effect transistors are switched off if a fault condition is detected.

4. The electronic control as claimed in claim 3, wherein: the control logic circuit includes a first phase inverter, a pulse delay circuit, a second phase inverter, first and second electrical AND gates and first and second drive circuits in electrical connection with the first and second discrete output lines.

5. The electronic control as claimed in claim 4 wherein the pulse delay circuit delays the pulse width modulated on/off motor current regulation command signal for a period of time that exceeds a device switch time of the first and second plurality of field effect transistors.

6. The electronic control as claimed in claim 3, wherein the pulse-width modulated on/off motor current regulation signal is cycled at a frequency of at least 15,000 Hz so that the control does not emit noise in an audible range for humans.

7. The electronic control as claimed in claim 1, further including at least one plug braking diode connected in parallel with an armature of the motor to commute armature current when a polarity of a field of the motor is reversed in order to brake a momentum of equipment driven by the motor.

8. The electronic control as claimed in claim 1, further including at least one low resistance, low inductance capacitor connected in parallel with a battery for providing the direct current supply, said capacitor having a capacitance adequate to even a load on the battery to an extent that the load is substantially constant.

9. An electronic control for a direct current traction motor, comprising:
   a first plurality of parallel-connected power field effect transistors arranged for connection in series with the motor, a field gate electrode of each first field effect transistor being connected to a first common control line;
   a second plurality of parallel-connected power field effect transistors arranged for connection in parallel with the motor, a field gate electrode of each second field effect transistor being connected to a second common control line; and
   control circuitry for generating first and second synchronous control signals, the control circuitry being connected to the first common control line which conducts the first control signal to switch the first field effect transistors in an on-off cycle of conduction to provide drive current to the motor from a direct current source, and the control circuitry being connected to the second common control line which conducts the second control signal for switching the second field effect transistors in a synchronous-rectification cycle of conduction for commuting a motor current when the first field effect transistors are switched off.

10. The electronic control for a direct current traction motor as claimed in claim 9 wherein the control circuitry includes a signal delay circuit, and the control circuitry generates the first and second control signals from a single pulse width modulated input signal, the first control signal corresponding in phase and duration to the pulse width modulated input signal and the second control signal being inverted in phase and delayed with respect to the first control signal so that the first and second plurality of field effect transistors are not simultaneously conductive.

11. The electronic control for direct current traction motor as claimed in claim 10 wherein the control circuitry further includes an enable signal input terminal and the control circuitry drives the first and second control signals low to turn off both the first and second plurality of field effect transistors when an enable signal applied to the input terminal is driven low, regardless of a state of the pulse width modulated input signal.

12. The electronic control for a direct current traction motor as claimed in claim 11 wherein the electronic control further includes a microprocessor generating the pulse width modulated signal and the enable signal.

* * * * *